(12) United States Patent
Fankhauser et al.

(10) Patent No.: US 7,768,753 B2
(45) Date of Patent: Aug. 3, 2010

(54) CIRCUIT ARRANGEMENT FOR PROTECTION AGAINST ELECTROSTATIC DISCHARGES AND METHOD FOR DIVERTING ELECTROSTATIC DISCHARGES

(75) Inventors: Bernd Fankhauser, Graz (AT); Dieter Maier, Ludmannsdorf (AT); Franz Unterleitner, Kalsdorf (AT)

(73) Assignee: Austriamicrosystems AG, Unterpremstaten (AT)

( * ) Notice: Subject to any disclaimer, the term of this patent is extended or adjusted under 35 U.S.C. 154(b) by 510 days.

(21) Appl. No.: 11/801,559

(22) Filed: May 10, 2007

(65) Prior Publication Data

US 2007/0268638 A1 Nov. 22, 2007

(51) Int. Cl.
- *H02H 3/20* (2006.01)
- *H02H 3/22* (2006.01)
- *H02H 9/04* (2006.01)

(52) U.S. Cl. .................. 361/56; 361/111; 361/91.1
(58) Field of Classification Search .......... 361/56, 361/111, 91.1
See application file for complete search history.

(56) References Cited

U.S. PATENT DOCUMENTS

| | | | |
|---|---|---|---|
| 4,573,099 A | 2/1986 | Ganesan et al. | |
| 5,463,520 A | 10/1995 | Nelson | |
| 5,663,860 A * | 9/1997 | Swonger | 361/56 |
| 5,978,192 A | 11/1999 | Young et al. | |
| 6,031,405 A * | 2/2000 | Yu | 327/313 |
| 6,744,611 B2 | 6/2004 | Yang et al. | |
| 7,450,358 B2 | 11/2008 | Gossner | |
| 2006/0209479 A1 | 9/2006 | Grombach et al. | |

FOREIGN PATENT DOCUMENTS

| | | |
|---|---|---|
| AT | 356 187 | 4/1980 |
| DE | 269 946 | 7/1989 |
| DE | 269 946 A1 | 7/1989 |
| DE | 10 2004 004 789 | 3/2005 |
| DE | 10 2004 004 789 B3 | 3/2005 |
| DE | 10 2005 013 687 | 12/2005 |
| DE | 10 2005 013 687 B3 | 12/2005 |
| GB | 1 574 078 | 9/1980 |

* cited by examiner

*Primary Examiner*—Stephen W Jackson
*Assistant Examiner*—Zeev Kitov
(74) *Attorney, Agent, or Firm*—Cohen Pontani Lieberman & Pavane LLP

(57) ABSTRACT

A circuit arrangement for protection against electrostatic discharges comprises a diverting element, which is connected between a first and a second terminal and has a control input, via which the diverting element can be controlled into the conducting state. Moreover, trigger elements are provided, which have a trigger output for outputting a trigger signal in a manner dependent on a voltage between the first and the second terminal. The circuit arrangement furthermore comprises at least one amplifier unit, which is coupled to one of the trigger outputs on the input side and to the control input on the output side.

13 Claims, 5 Drawing Sheets

CIRCUIT ARRANGEMENT FOR PROTECTION AGAINST ELECTROSTATIC DISCHARGES AND METHOD FOR DIVERTING ELECTROSTATIC DISCHARGES

RELATED APPLICATION

This patent application claims the priority of the German patent application no. 10 2006 021 847.7 filed May 10, 2006, the disclosure content of which is hereby explicitly incorporated by reference.

FIELD OF THE INVENTION

The invention relates to a circuit arrangement for protection against electrostatic discharges and to a method for diverting electrostatic discharges.

BACKGROUND OF THE INVENTION

In the case of electrostatic discharges, ESD, high voltages occur for example between terminals of an electrical circuit. This can lead to high currents through the circuit. In the case of integrated circuits, in particular, it is possible for the circuit to be destroyed thereby.

In order to protect a circuit against electrostatic discharges, it is possible to provide protection circuits which, in the case of an electrostatic discharge, that is to say when a high voltage occurs, can divert a current and thus protect the electrical circuit against being destroyed.

FIG. 11 shows an exemplary embodiment of a conventional circuit for protection against electrostatic discharges for positive signal voltages. A PNP bipolar transistor T1 is connected as a diverting element between terminals K1, K2. In addition, the terminals K1, K2 are coupled via a series circuit comprising a resistor R1 and a Zener diode D1. The connecting node between the components in the series circuit is connected to the control terminal or base terminal B of the transistor T1.

Particularly in the case of circuits in the semiconductor area which operate with relatively high signal voltages or operating voltages, PNP transistors are often used as diverting elements in protection circuits since, in contrast to NPN transistors, they do not have a voltage snapback. A diverting element having voltage snapback goes into a low-impedance state after triggering and causes the voltage present across the diverting element to fall. This is shown by way of example in a voltage-current diagram of a diverting element in FIG. 12. In the diagram, a current I through a diverting element is represented as a function of a voltage V across the diverting element. Proceeding from a low voltage, the diverting element attains a conducting state in the event of an increase in the voltage to or above a breakdown voltage VBP, whereby a current starts to flow. At the same time, however, the voltage across the diverting element firstly falls to a holding voltage VH. Current and voltage can rise further from this point on.

In applications with lower operating voltages, for example an operating voltage VNV, the holding voltage VH lies above the operating voltage VNV of the circuit arrangement and does not lead to a rise in the current through the diverting element. At higher operating voltages, the holding voltage VH may lie below a different operating voltage VHV, for example. In the event of triggering of a diverting element having a voltage snapback, the supply voltage VHV may be present across the low-impedance diverting element and bring about a high current flow that may lead as far as the destruction of the diverting element.

If, in FIG. 11, the voltage between emitter E and collector C of the transistor T1 exceeds the Zener voltage of the Zener diode D1, a current can flow from the base of the transistor T1, whereby the transistor T1 is turned on and starts to conduct. However, a Zener diode generally supplies relatively little triggering current for turning on the transistor. The Zener diode D1 should therefore be given sufficiently large dimensions in order to supply a necessary triggering current for a reliable turn-on of the transistor T1.

FIG. 13 shows a further exemplary embodiment of a conventional circuit for protection against electrostatic discharges for positive and negative signal voltages. The PNP transistor T1 is connected between the terminals K1, K2. The base terminal B of the transistor T1 is not connected. In order that a circuit arrangement of this type can be used for positive and negative signal voltages, it is expedient that the base B of the transistor T1 can float with regard to its potential, that is to say is not connected to a fixed potential. This is intended to have the effect that an internal diode of the bipolar transistor T1 is forward-biased neither in the positive direction nor in the negative direction.

In normal operation, that is to say where no electrostatic discharge occurs, the transistor T1 should be switched off, that is to say non-conducting. In the case of an electrostatic discharge, the voltage between emitter E and collector C of the transistors T1 exceeds a normal operating voltage of the transistor, whereby it becomes conducting. By way of example, in the case of a positive pulse of an electrostatic discharge between emitter E and collector C, the PN junction between base B and collector C can break down and thus turn on the transistor T1. As an alternative, by way of example, in the case of a negative pulse of an electrostatic discharge, the PN junction between base B and emitter E can break down, whereby the transistor T1 is turned on. However, the base current generated by the pulse of the electrostatic discharge in the transistor T1 is usually small, such that the effectiveness of an arrangement of this type is generally inadequate.

Consequently, the arrangements described cannot ensure that a diverting element is reliably turned on. Accordingly, a current caused by an overvoltage on account of an electrostatic discharge cannot reliably be diverted from a circuit to be protected.

SUMMARY

In one embodiment a circuit arrangement for protection against electrostatic discharges comprises a diverting element, which is connected between a first and a second terminal and has a control input, via which the diverting element can be controlled into the conducting state. Moreover, the circuit arrangement comprises a first trigger element which has a first trigger output for outputting a first trigger signal in a manner dependent on a voltage between the first and the second terminal, and a first amplifier unit, which is coupled to the first trigger output on the input side and to the control input on the output side.

If, by way of example, an electrostatic discharge occurs between the first and the second terminal, this can be identified by the first trigger element. In this case, the first trigger element can output a trigger signal, which is amplified by the first amplifier unit. The amplified trigger signal can be fed to the diverting element via the control input in order to put the diverting element into a conducting, low-impedance state. A current brought about by the electrostatic discharge can flow away via the diverting element. Thus, by way of example, components of a circuit that is connected to the first and second terminals can be protected against being destroyed.

The amplification of the trigger signal makes it possible to ensure that even in the case of a small trigger signal of the first trigger element, for example a small triggering current, the diverting element is reliably put into a conducting state and electrostatic discharges can be diverted with improved reliability.

The diverting element may comprise a transistor, the controlled path of which is connected between the first and the second terminal. By way of example, the diverting element comprises a PNP bipolar transistor or a p-channel field effect transistor for this purpose. As a result of the turn-on of the controlled path of the transistor in the diverting element into a low-impedance state, a current on account of an electrostatic discharge can be diverted via the transistor.

In one embodiment, the first amplifier unit comprises at least one transistor having a control terminal coupled to the first trigger output. The trigger signal can therefore be amplified by means of a transistor-based amplifier. For the amplification of the trigger signal, it is also possible for a plurality of transistors to be connected in series for the purpose of amplification. By way of example, an amplifier cascade is formed from a plurality of transistors.

In a further embodiment, the circuit arrangement comprises a second trigger element, which has a second trigger output for outputting a second trigger signal in a manner dependent on the voltage between the first and the second terminal, and a second amplifier unit, which is coupled to the second trigger output on the input side and to the control input on the output side.

The provision of a second trigger element with amplifier unit connected downstream makes it possible, in the circuit arrangement, to output trigger signals for different voltages between the first and the second terminal. By way of example, the first trigger element is set up for outputting the first trigger signal if the voltage between the first and the second terminal exceeds a positive threshold value. The second trigger element may be set up for outputting the second trigger signal if the voltage between the first and the second terminal falls below a negative threshold value.

In the event of a positive voltage spike on account of an electrostatic discharge with a positive voltage having a magnitude greater or more positive than the positive threshold value, the first trigger element outputs the first trigger signal. The second trigger element outputs the second trigger signal if a negative voltage spike occurs between the first and the second terminal on account of an electrostatic discharge with a negative voltage having a magnitude greater or more negative than the negative threshold value. Therefore, a trigger signal is in each case output if the magnitude of the voltage between the first and the second terminal is greater than the respective magnitude of the threshold value.

In one embodiment, the second amplifier unit comprises at least one transistor having a control terminal coupled to the second trigger output. Consequently, in the second amplifier unit, too, the trigger signal can be amplified by means of one or a plurality of transistors.

The first trigger element may be connected between the first and the second terminal. Moreover, the first trigger element may comprise a Zener diode.

The second trigger element may also be connected between the first and the second terminal. The second trigger element may likewise comprise a Zener diode. Consequently, the outputting of the respective trigger signals may depend on the Zener voltage of the respective Zener diode.

In an embodiment of a method for diverting electrostatic discharges, a trigger signal is generated in a manner dependent on a voltage between a first and a second terminal. The trigger signal is amplified. The first and the second terminal are conductively connected in a manner dependent on the amplified trigger signal.

If the voltage between the first and the second terminal exceeds or falls below specific threshold values, a trigger signal can be generated. In order to ensure a sufficient magnitude of the trigger signal, the trigger signal is amplified. The first and second terminals are conductively connected to one another in a manner dependent on the amplified trigger signal, with the result that a current flow that occurs on account of the high voltage during an electrostatic discharge is effected via this conductive connection. As a result, components of a circuit that is connected to the first and second terminals can be protected against being destroyed by excessively high currents on account of electrostatic discharge. The amplification of the trigger signal improves a reliability when diverting electrostatic discharges.

By way of example, the conductive connection of the first and second terminals may be effected by means of a PNP bipolar transistor or a p-channel field effect transistor.

The trigger signal may be generated if the voltage between the first and the second terminal exceeds a positive threshold value or if the voltage between the first and the second terminal falls below a negative threshold value. Consequently, both electrostatic discharges with a positive pulse and electrostatic discharges with a negative pulse can be reliably diverted. An amplification of the trigger signal may be effected by means of at least one transistor.

BRIEF DESCRIPTION OF THE DRAWINGS

The invention is explained in detail below on the basis of exemplary embodiments with reference to the drawings.

Components that are functionally identical or identical in terms of their effect bear identical reference symbols.

DETAILED DESCRIPTION OF THE DRAWINGS

Figure 1:
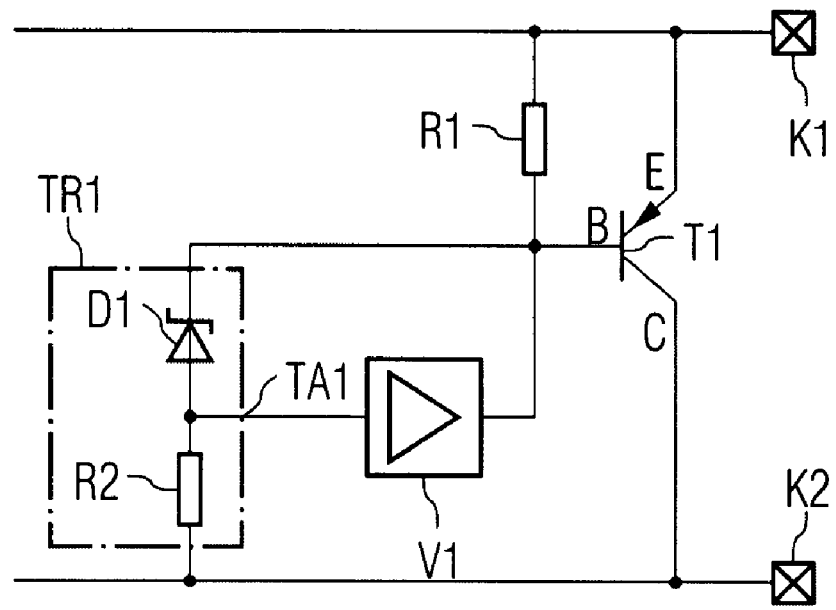
FIG. 1 shows a first exemplary embodiment of a circuit arrangement.

FIG. 1 shows an exemplary embodiment of a circuit arrangement for protection against electrostatic discharges. For this purpose, a PNP bipolar transistor is provided as diverting element T1, said transistor being connected between a first terminal K1 and a second terminal K2. The emitter terminal E and control input or base terminal B are coupled via a resistor R1. In this case, the resistor R1 may also be integrated in the transistor T1 in parasitic fashion. Moreover, a first trigger element TR1 is provided, which is connected between the control input B and the second terminal K2. The first trigger element comprises a Zener diode D1 and a resistor R2. A connecting node between the Zener diode D1 and the resistor R2 forms a first trigger output TA1. Connected thereto is a first amplifier unit V1, which is connected to the control input B on the output side.

The terminals K1, K2 may be arbitrary terminals of an electronic circuit to be protected, in particular of an integrated circuit. The terminals K1 and K2 may be used by the circuit to be protected as terminals for supplying or outputting signals or else as supply terminals for an operating voltage. In the exemplary embodiment shown, it is assumed that the circuit to be protected operates with positive signal voltages at the terminals K1, K2, that is to say that a potential at the first terminal K1 is generally higher than a potential at the second terminal K2. The circuit to be protected is not depicted in FIG. 1.

In the normal case, that is to say when no electrostatic discharge occurs, no current flows via the resistor R1 and through the first trigger circuit TR1. The resistor R1 makes it possible to ensure that base B and emitter E of the transistor T1 have no potential difference. Since, moreover, no base current flows via the control input B in the transistor T1, the transistor T1 is therefore not in a conducting state in the normal case.

In the case of an electrostatic discharge, the voltage between the first and second terminals K1, K2 rises significantly. This leads to a Zener breakdown of the Zener diode D1 in the first trigger element TR1, which brings about a current flow from the first terminal K1 via the resistor R1, the Zener diode D1 and the resistor R2 to the second terminal K2. As a result, a trigger signal is output at the trigger output TA1, said trigger signal being amplified by the amplifier unit V1. Via the control input B, the amplifier unit V1 puts the diverting element T1 into a conducting state with the amplified trigger signal. A current flow between the first and second terminal K1, K2 is thus essentially effected via the conductive connection of the terminals K1, K2 through the diverting element T1. This takes place until the electrostatic discharge has been diverted.

Figure 2:
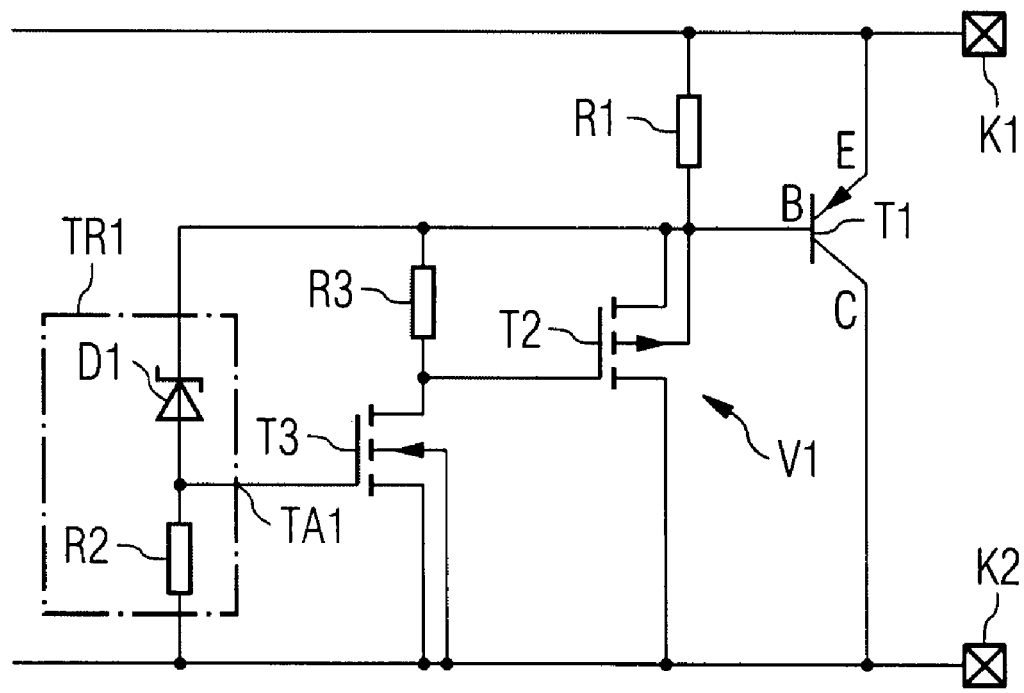
FIG. 2 shows a second exemplary embodiment of a circuit arrangement.

FIG. 2 shows a further exemplary embodiment of the circuit arrangement. In this case, the first amplifier unit V1 comprises a resistor R3, a normally off n-channel field effect transistor, the control input or gate of which is coupled to the trigger output TA1, and a normally off p-channel field effect transistor T2, the gate terminal of which is connected between the resistor R3 and the transistor T3. As output of the amplifier unit V1, the transistor T2 is coupled to the control input B.

In normal operation, the Zener voltage of the Zener diode D1 is not exceeded. Therefore, owing to the low voltage across the resistor R2, the transistor T3 remains in a switched-off, non-conducting state, whereby the transistor T2 is also kept in a non-conducting state.

In the case of an electrostatic discharge, that is to say when the voltage between emitter E and collector C of the diverting element T1 starts to rise considerably, the Zener voltage of the Zener diode D1 is exceeded and a current starts to flow through it. Said current causes a voltage drop at the resistor R2, which, as trigger signal, turns on the gate of the transistor T3. The higher the voltage generated by the electrostatic discharge becomes, the higher the current through the Zener diode D1 becomes. The voltage drop at the resistor R3 also rises proportionally to this, whereby the conductivity of the transistor T3 is increased further.

As a result of the current flow via the transistor T3 and the resistor R3, the gate of the p-channel field effect transistor T2 is discharged and the transistor T2 is thereby controlled in low-impedance fashion. The low-impedance connection of the control input B to the second terminal K2 thus results in the generation of the base current of the diverting element T1 via the transistor T2 as amplified trigger signal. As a result, the diverting element T1 is controlled into the conducting state and the electrostatic discharge can be diverted via the diverting element T1 with improved reliability.

The conductivity of the transistors T1, T2, T3 usually increases in the event of rising voltage as a result of the electrostatic discharge, whereby the electrostatic discharge is diverted better.

In the exemplary embodiments shown, instead of being connected to the control input B, the Zener diode D1 could also be connected directly to the first terminal K1.

Figure 3:
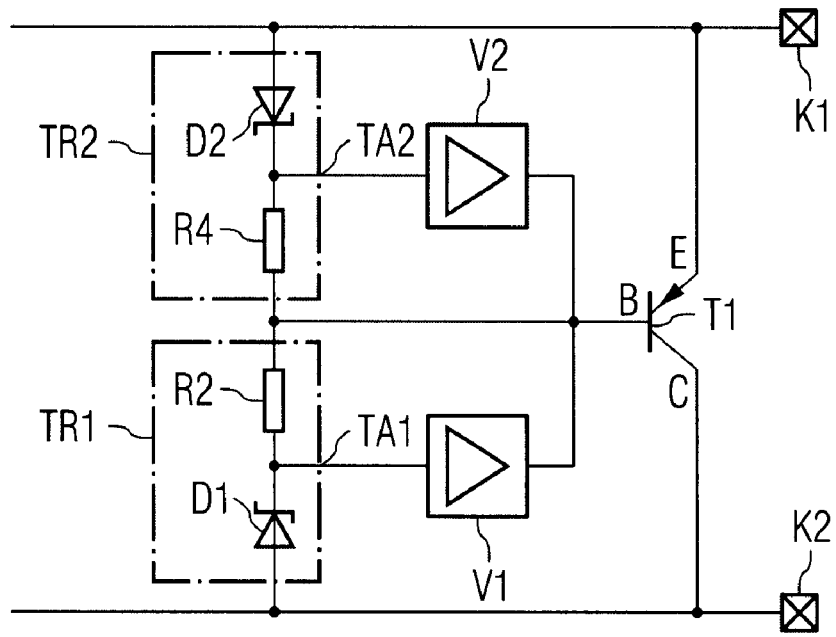
FIG. 3 shows a third exemplary embodiment of a circuit arrangement.

FIG. 3 shows a further exemplary embodiment of a circuit arrangement for protection against electrostatic discharges, which can be used also to protect electronic circuits in which positive and negative signal voltages or operating voltages can occur at the terminals to be protected. For this purpose, alongside the first trigger element TR1 with amplifier unit V1 connected downstream, a second trigger element TR2 and a second amplifier unit V2 are provided. The second trigger element TR2 comprises a resistor R4 and a Zener diode D2, which is provided with opposite polarity in comparison with the diode D1. The first and the second trigger element TR1, TR2 are connected in series between the first and the second terminal K1, K2.

In this exemplary embodiment, the PNP transistor T1 is preferably constructed symmetrically, that is to say that it has p-type regions that are essentially of identical size and doped identically.

Independently of a polarity of a voltage between the terminals K1, K2, one of the Zener diodes D1, D2 is forward-biased. Since, however, in normal operation, that is to say without electrostatic discharge, the respective other Zener diode is in a turned-off state, a current flow via the trigger elements TR1, TR2 nevertheless does not occur in this case. It is only when an electrostatic discharge occurs that a Zener breakdown occurs in one of the Zener diodes D1, D2 and a current flow via the Zener diodes D1, D2 thus occurs.

If a high positive voltage that is greater than a positive threshold value is produced on account of an electrostatic discharge with a positive pulse between the first and second terminals K1, K2, the Zener breakdown occurs in the Zener diode D1, whereby the first trigger signal is output via the trigger output TA1 to the first amplifier unit V1 and is amplified by the latter. The amplified first trigger signal controls the diverting element T1 into a conducting state, with the result that the electrostatic discharge is diverted via the diverting element T1.

If a high negative voltage that is less than a negative threshold value occurs on account of a negative pulse of an electrostatic discharge between the first and second terminals, a Zener breakdown takes place in the Zener diode D2. As a result, the second trigger signal is generated and output via the second trigger output TA2 to the second amplifier unit V2. The amplified second trigger signal serves in turn for turning on the diverting element T1 into a conducting state.

Figure 4:
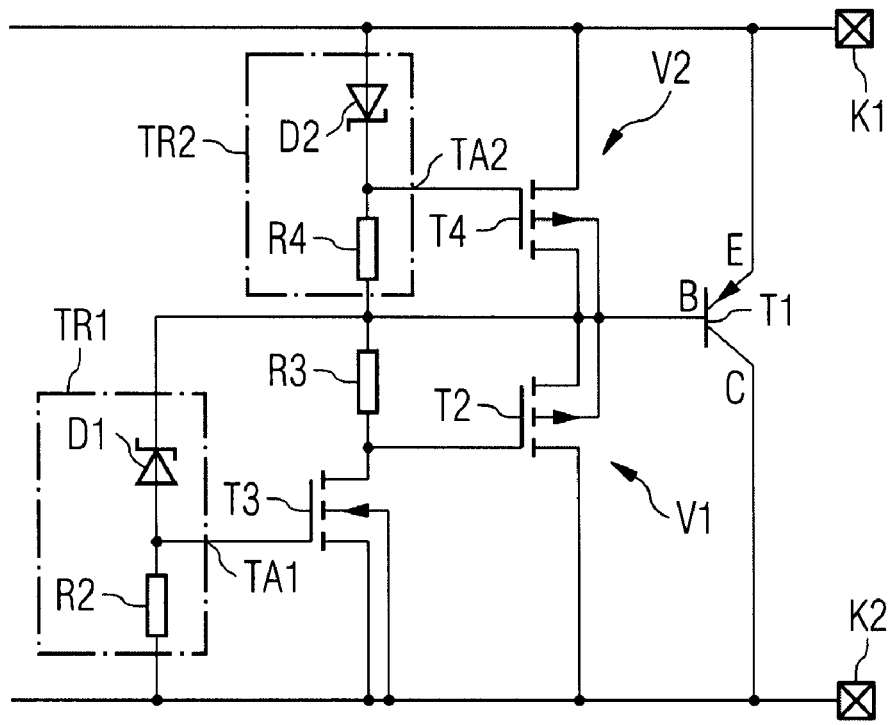
FIG. 4 shows a fourth exemplary embodiment of a circuit arrangement.

FIG. 4 shows a further exemplary embodiment of a circuit arrangement. In this case, the first trigger element TR1 and the first amplifier unit V1 correspond to the arrangement shown in FIG. 2. The second amplifier unit V2 comprises a normally off p-channel field effect transistor T4, the gate terminal of which is coupled to the second trigger output TA2. On the output side, the second amplifier unit V2 is coupled to the control input B.

In the event of a positive pulse of an electrostatic discharge and a resultant positive voltage between the terminals K1, K2, a Zener breakdown of the Zener diode D1 can occur. The mode of operation of the circuit arrangement for this case corresponds to the mode of operation of the circuit arrangement shown in FIG. 2.

For a negative voltage between the first and second terminals K1, K2 on account of an electrostatic discharge, the Zener voltage of the Zener diode D2 is exceeded and a current starts to flow through it. Said current causes a voltage drop at the resistor R4, by means of which the gate of the p-channel field effect transistor T4 is turned on. Since the p-channel field effect transistor T4 is connected to the control input B of the diverting element T1, the latter is also turned on, with the result that the terminals K1, K2 are connected in low-impendence fashion via the diverting element T1. Consequently, the electrostatic discharge can once again be reliably diverted via the diverting element.

Figure 5:
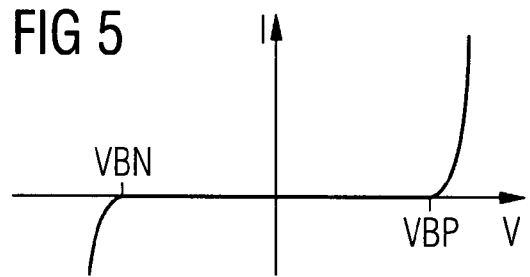
FIG. 5 shows a first exemplary voltage-current diagram.

FIG. 5 shows an exemplary voltage-current diagram in accordance with a circuit arrangement according to FIG. 3 or FIG. 4. The illustration shows the current via the diverting element T1 as a function of the voltage between the terminals K1, K2. For positive voltages, an appreciable current flow is discernable only starting from a positive threshold value VBP. Likewise, an appreciable current flows for negative voltages only starting from a negative threshold value VBN. As a result, it is possible for a circuit that is to be protected to be operated at the terminals K1, K2 with signal voltages or operating voltages that have positive or negative polarity and in this case lie between the negative threshold value VBN and the positive threshold value VBP. A triggering of the circuit arrangement according to one of the embodiments shown, that is to say a low-impedance connection of the first and second terminals K1, K2, is therefore effected only if higher or lower voltages than the respective threshold values are present at the terminals K1, K2, for example on account of an electrostatic discharge.

Figure 6:
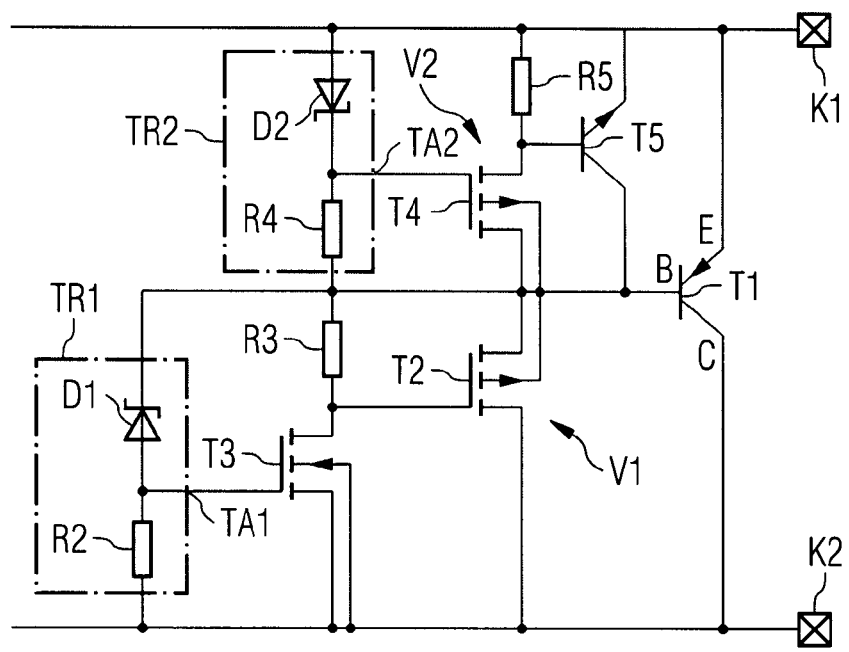
FIG. 6 shows a fifth exemplary embodiment of a circuit arrangement.

FIG. 6 shows a further exemplary embodiment of the circuit arrangement. In addition to the arrangement shown in FIG. 4, a resistor R5 and an NPN bipolar transistor T5 are provided. The resistor R5 is connected between the first terminal K1 and the transistor T4. The transistor T5 is coupled to the first terminal K1 and to the control input B. The control terminal of the transistor T5 is connected to the connecting node between the resistor R5 and the transistor T4.

If the Zener diode D2 undergoes transition to the conducting state for a high negative voltage between the terminals K1, K2 and the second trigger signal turns on the transistor T4 into the conducting state, then a voltage drop across the resistor R5 is also generated by means of the current flow via the transistor T4. The transistor T5 is turned on by the ever increasing voltage drop across the resistor R5 and helps to turn on the diverting element T1. The NPN transistor T5 used can be dimensioned in such a way that it has a voltage snapback in the case of a specific voltage value or a current value resulting therefrom and can thereby divert even large quantities of current. The transistor T5 thus supports the transistor T4 in the driving of the diverting element T1. In the event of a voltage snapback, the transistor T5 acquires very low impedance and turns on the diverting element T1 in such a way that the latter can divert an ESD pulse even better. Since the voltage snapback does not take place directly when the trigger voltage is reached, this may also be referred to as a voltage snapback that occurs in a delayed fashion.

Figure 7:
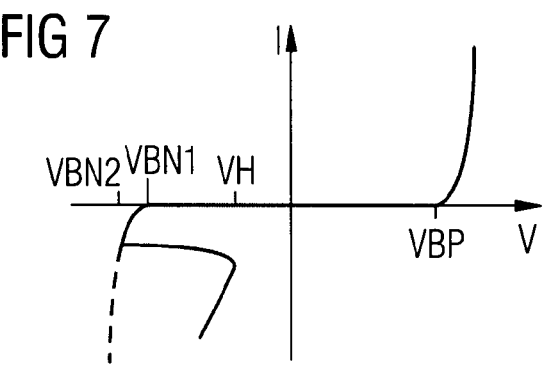
FIG. 7 shows a second exemplary voltage-current diagram.

FIG. 7 shows a further exemplary voltage-current diagram for application of the circuit arrangement shown in FIG. 6. For positive voltages, the diagram corresponds to the diagram shown in FIG. 5. For negative voltages, a current flow is discernable for voltages below a first negative threshold value VBN1. At negative voltages of greater magnitude, starting from a second negative threshold value VBN2 a voltage snapback occurs, starting from which part of the current flow between the first and second terminals K1, K2 is effected via the transistor T5. The dashed line indicates that the second negative threshold value VBN2 can be varied by corresponding dimensioning of the transistor T5 and/or of the resistor R5. Likewise, the transistor T5 and/or the resistor R5 can be dimensioned in such a way that no voltage snapback occurs via the transistor T5 and the latter acts only to support the transistor T4 in the driving of the diverting element T1.

When using a circuit arrangement in an embodiment with a voltage snapback that occurs in a delayed fashion, care should be taken to ensure that generally no signal voltages that are greater in magnitude than the negative holding voltage VH to which the voltage snapback takes place occur at the terminals K1, K2. The diverting element T1 or the transistor T5 may otherwise be destroyed owing to permanently occurring high currents.

Figure 8:
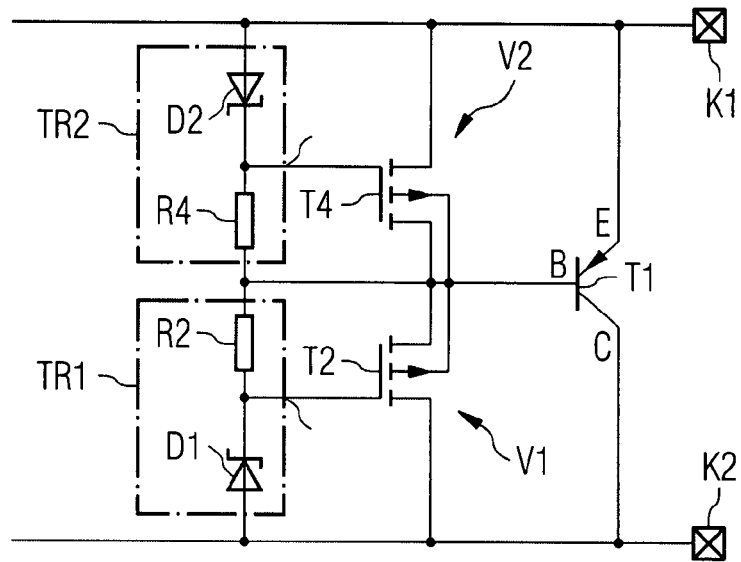
FIG. 8 shows a sixth exemplary embodiment of a circuit arrangement.

FIG. 8 shows a further exemplary embodiment of the circuit arrangement. The second trigger element TR2 and the second amplifier unit V2 correspond in terms of construction and function to the embodiment shown in FIG. 4. The first amplifier unit for amplifying the first trigger signal comprises only the p-channel field effect transistor T2. In the event of a Zener breakdown of the Zener diode D1, the potential at the gate terminal of the transistor T2 is pulled in the direction of the potential at the second terminal K2. A voltage corresponding to the Zener voltage of the Zener diode D1 remains, however. Consequently, the transistor T2 can be turned on to a somewhat lesser extent than shown in FIG. 4, for example. This may nevertheless be sufficient, depending on the requirement made of the circuit arrangement for protection against electrostatic discharges. Particular advantages arise on account of a somewhat lower outlay on circuitry.

Figure 9:
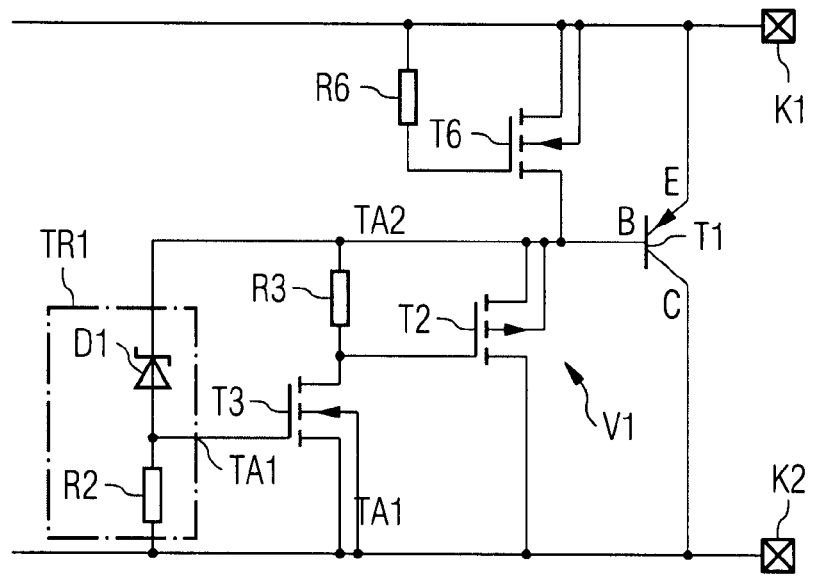
FIG. 9 shows a seventh exemplary embodiment of a circuit arrangement.

FIG. 9 shows an exemplary embodiment of a circuit arrangement, in which an n-channel field effect transistor T6 is provided for the triggering for negative voltages on account of an electrostatic discharge with a negative pulse, the controlled path of said transistor being connected between the first terminal K1 and the control input B and the gate terminal of said transistor being coupled to the first terminal K1 via a resistor R6.

In this embodiment transistor T6 serves both as a trigger element and as an amplifier unit. The trigger function is realized by means of a reverse-biased junction within the field effect transistor T6 and a respective break-down of said junction. Amplifying is performed by a lateral NPN-transistor comprised by transistor T6, wherein also snapback effects can be utilized. Transistor T6 can be a conventional n-channel field effect transistor or as a non-limiting example a gate coupled n-channel field effect transistor.

Figure 10:
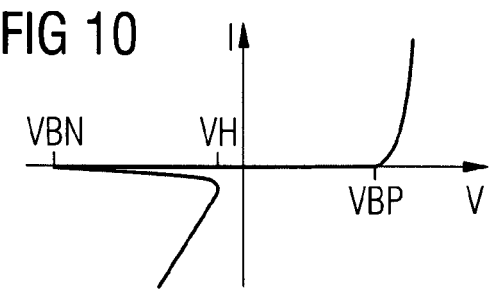
FIG. 10 shows a third exemplary voltage-current diagram.
Figure 11:
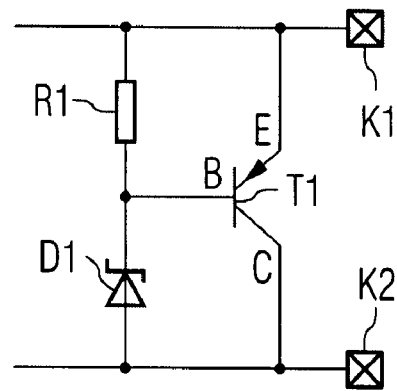
FIG. 11 shows a first exemplary embodiment of a conventional circuit arrangement for protection against electrostatic discharge.
Figure 12:
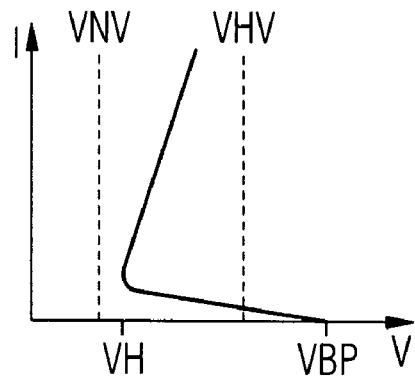
FIG. 12 shows a voltage-current diagram of a diverting element.
Figure 13:
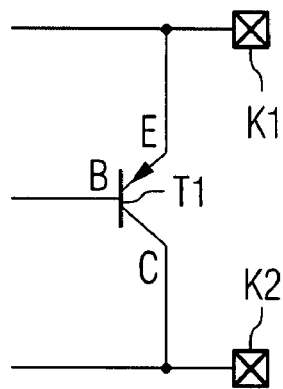
FIG. 13 shows a second exemplary embodiment of a conventional circuit arrangement for protection against electrostatic discharge.

FIG. 10 shows an exemplary voltage-current diagram for a circuit arrangement having this construction. For positive voltages, the current profile once again corresponds to the current profile shown in FIG. 5. For negative voltages it is evident that when a negative threshold value for the voltage is undershot, a breakdown with simultaneous voltage snapback to a holding voltage VH occurs, that is to say that the transistor T6 remains conducting up to the holding voltage VH. When using a circuit of this type, care should once again be taken to ensure that generally no signal voltages that are more negative than the holding voltage VH are present at the terminals K1, K2, in order to prevent destruction of the transistor T6 and/or the diverting element T1.

By way of example, n-metal oxide semiconductor, NMOS transistors can be used for the n-channel field effect transistors. PMOS transistors can likewise be used for the p-channel field effect transistors. Furthermore, PNP bipolar transistors can also be used instead of PMOS transistors, and vice versa. Equally, NMOS transistors and NPN bipolar transistors can also be mutually interchanged.

Instead of Zener diodes, it is possible to use in the trigger elements field effect transistors, for example, which have a corresponding field threshold voltage by means of which a positive or negative threshold value can be set.

An interconnection of a trigger element with an amplifier unit connected downstream as shown in the exemplary embodiments may also be regarded as a cascaded trigger.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A circuit arrangement for protection against electrostatic discharges, comprising:
    a diverting element, which is connected between a first terminal and a second terminal and has a control input, via which the diverting element can be controlled into the conducting state;
    a first trigger element, which has a first trigger output for outputting a first trigger signal to the control input in a manner dependent on a voltage between the first and second terminals, the first trigger output being coupled to the control input;
    a first amplifier unit, which has an input coupled to the first trigger output, and an output coupled to the control input, for amplifying the first trigger output; and
    a second trigger element, which has a second trigger output for outputting a second trigger signal to the control input in a manner dependent on the voltage between the first and second terminals, the second trigger output being coupled to the control input which is coupled to the first trigger output;
    wherein the first trigger element is arranged for outputting the first trigger signal if the voltage between the first and second terminals exceeds a positive threshold value; and
    wherein the second trigger element is arranged for outputting the second trigger signal if the voltage between the first and second terminals falls below a negative threshold value.

2. The circuit arrangement as claimed in claim 1, wherein the diverting element comprises a transistor having a controlled path which is connected between the first and second terminals.

3. The circuit arrangement as claimed in claim 1, wherein the diverting element comprises a PNP-bipolar transistor or a p-channel field effect transistor having controlled paths which are each connected between the first and second terminals.

4. The circuit arrangement as claimed in claim 1, wherein the first amplifier unit comprises at least one transistor having a control terminal which is coupled to the first trigger output.

5. The circuit arrangement as claimed in claim 1, wherein at least one of the first trigger element and the second trigger element are each coupled between the first and second terminals.

6. The circuit arrangement as claimed in claim 1, wherein the first and second trigger elements are connected in series.

7. The circuit arrangement as claimed in claim 1, wherein at least one of the first trigger element and the second trigger element comprise a Zener diode.

8. The circuit arrangement as claimed in claim 1, wherein the second trigger output is coupled to the control input by a second amplifier unit for amplifying the second trigger output.

9. The circuit arrangement as claimed in claim 8, wherein the second amplifier unit comprises at least one transistor having a control terminal coupled to the second trigger output.

10. A method for diverting electrostatic discharges, comprising:
    generating a trigger signal at one of a first trigger element and a second trigger element depending on a voltage between a first terminal and a second terminal, the trigger signal being generated and provided to a control input of a diverting element if the voltage between the first and second terminals exceeds a positive threshold value or falls below a negative threshold value, a trigger output of each of the first and second trigger elements being connected to the control input of the diverting element;
    amplifying the trigger signal provided to the control input of the diverting element; and
    conductively connecting the first and second terminals depending on the amplified trigger signal provided to the diverting element.

11. The method as claimed in claim 10, wherein the conductive connection is effected by a PNP-bipolar transistor or a p-channel field effect transistor.

12. The method as claimed in claim 10, wherein the amplification of the trigger signal is effected by at least one transistor.

13. A method for diverting electrostatic discharges, comprising:
    generating a first trigger signal at a first trigger element if a voltage between a first terminal and a second terminal exceeds a positive threshold value;
    generating a second trigger signal at a second trigger element if the voltage between the first and second terminals falls below a negative threshold value;
    amplifying the first or the second trigger signal, the first trigger element and the second trigger element being connected to a control input of a diverting element, and the amplified first or second trigger signal being received at the control input of the diverting element; and
    conductively connecting the first and second terminals depending on the respective amplified trigger signal.

* * * * *

UNITED STATES PATENT AND TRADEMARK OFFICE
CERTIFICATE OF CORRECTION

| | | |
|---|---|---|
| PATENT NO. | : 7,768,753 B2 | Page 1 of 1 |
| APPLICATION NO. | : 11/801559 | |
| DATED | : August 3, 2010 | |
| INVENTOR(S) | : Bernd Fankhauser et al. | |

It is certified that error appears in the above-identified patent and that said Letters Patent is hereby corrected as shown below:

Title page, insert item (30),

--(30) Foreign Application Priority Data

May 10, 2006 (DE)   10 2006 21 847--

Signed and Sealed this
Twenty-eighth Day of December, 2010

David J. Kappos
*Director of the United States Patent and Trademark Office*